United States Patent
Adams, Jr. et al.

(10) Patent No.: US 9,338,308 B1
(45) Date of Patent: May 10, 2016

(54) PERSONALIZED PRODUCT PACKAGE RECOMMENDATION ENGINE

(71) Applicant: Sprint Communications Company L.P., Overland Park, KS (US)

(72) Inventors: Thomas M. Adams, Jr., Wildwood, MO (US); Daniel J. Aldrich, Mission, KS (US); Ignacio Andrade, III, Kansas City, KS (US); Horace Warren Duncan, III, Leawood, KS (US); Christopher Loren Langston, Springfield, MO (US); Jeffrey A. Richmond, Marion, KS (US); William L. Stifter, Overland Park, KS (US); David Walker, Kansas City, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 152 days.

(21) Appl. No.: 14/297,714

(22) Filed: Jun. 6, 2014

(51) Int. Cl.
*H04W 4/24* (2009.01)
*H04M 15/00* (2006.01)

(52) U.S. Cl.
CPC .................................. *H04M 15/745* (2013.01)

(58) Field of Classification Search
CPC ..... H04M 15/80; H04M 15/70; H04M 15/58; H04M 2215/0018; H04M 15/43; H04M 15/44; H04M 15/8055; H04M 15/8061; H04M 15/28; H04M 15/66; H04M 15/8207; H04M 15/853; H04M 15/41; H04M 15/82; H04M 2215/92; H04W 4/24
See application file for complete search history.

(56) References Cited

U.S. PATENT DOCUMENTS

| | | | | |
|---|---|---|---|---|
| 8,725,590 | B2 * | 5/2014 | Lipscher | G06Q 10/109 705/2 |
| 9,112,706 | B2 * | 8/2015 | Ganapathy | H04L 12/14 |
| 2002/0120540 | A1 * | 8/2002 | Kende | G06Q 20/10 705/35 |
| 2009/0132284 | A1 * | 5/2009 | Fey | G06F 19/322 705/3 |
| 2010/0269044 | A1 * | 10/2010 | Ivanyi | G06Q 30/02 715/736 |
| 2012/0089727 | A1 * | 4/2012 | Raleigh | H04L 12/14 709/224 |
| 2013/0132854 | A1 * | 5/2013 | Raleigh | G06F 3/0482 715/738 |
| 2015/0016595 | A1 * | 1/2015 | Yugandhar | H04M 15/43 379/114.03 |

* cited by examiner

*Primary Examiner* — Liton Miah

(57) ABSTRACT

Systems and methods discussed herein relate to a personalized recommendation engine. The personalized recommendation engine makes recommendations for packages of components sold and/or supported by a telecommunications service provider such as electronic devices, accessories, subscription plans, services, and applications. These package recommendations are based upon user input, telecommunications service provider input, and customer feedback from customers who made previous purchases using the personalized recommendation engine. Each component from a pool of components is ranked based upon this input, package components are selected and bundled, and the packages are recommended to the user based upon the overall package score which is determined by user input, telecommunications service provider input, and in some cases customer feedback.

19 Claims, 7 Drawing Sheets

| | Device 1 | Device 2 | Device 3 | Device 4 | Device 5 |
|---|---|---|---|---|---|
| Flip-phone | 0 | 10 | 0 | 0 | 0 |
| Smartphone | 10 | 0 | 0 | 10 | 10 |
| Slider phone | 0 | 0 | 10 | 0 | 10 |
| Virt. Keybd | 10 | 10 | 0 | 0 | 10 |
| Att. Keybd | 0 | 0 | 10 | 10 | 10 |

| | Device 1 | Device 2 | Device 3 | Device 4 | Device 5 |
|---|---|---|---|---|---|
| Cooking | 3 | 9 | 7 | 7 | 2 |
| Sports | 6 | 2 | 9 | 8 | 6 |
| Photo-share | 10 | 3 | 3 | 8 | 1 |
| Video chat | 8 | 3 | 5 | 0 | 9 |
| Coupons | 2 | 3 | 0 | 6 | 6 |

FIG. 1

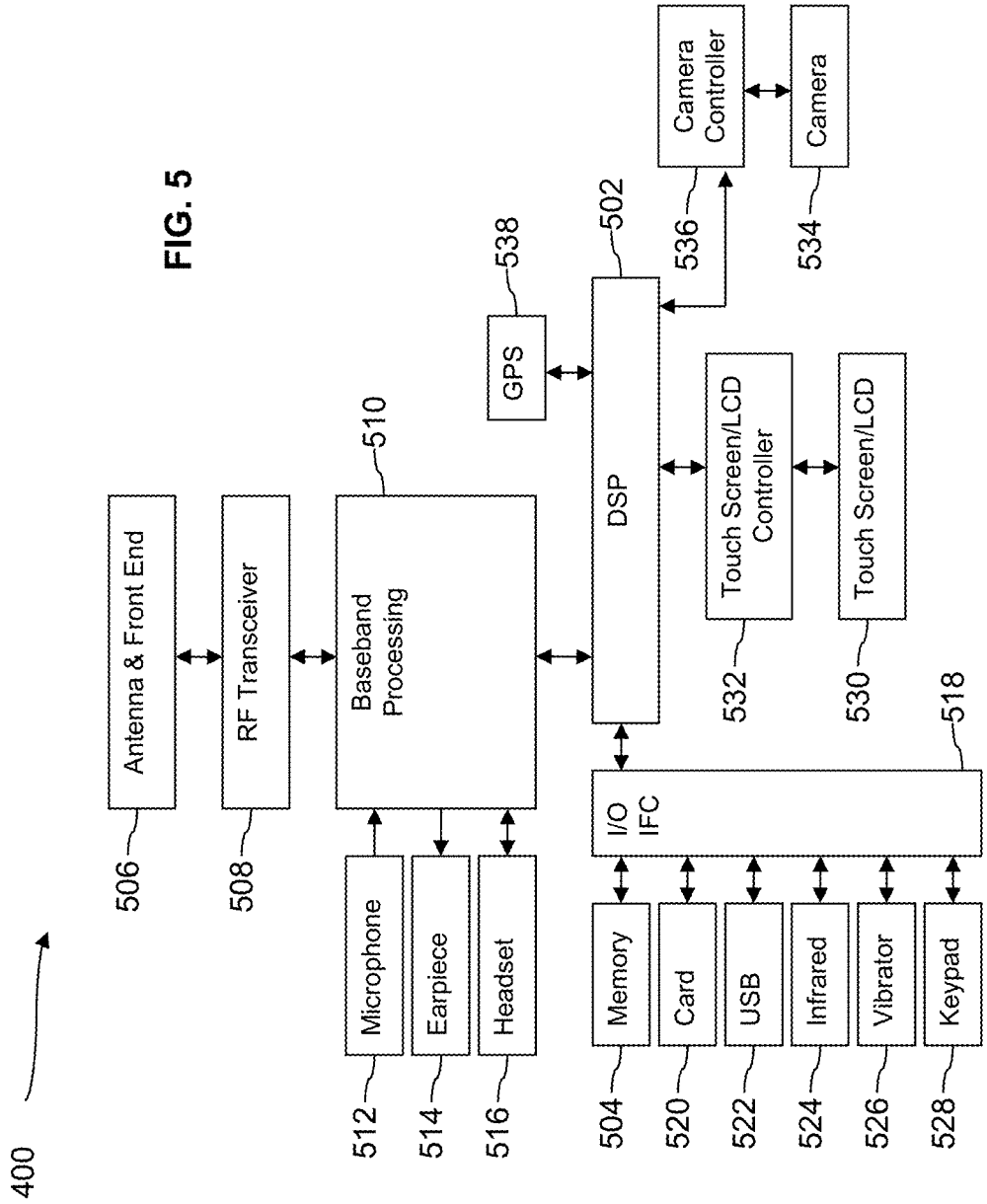

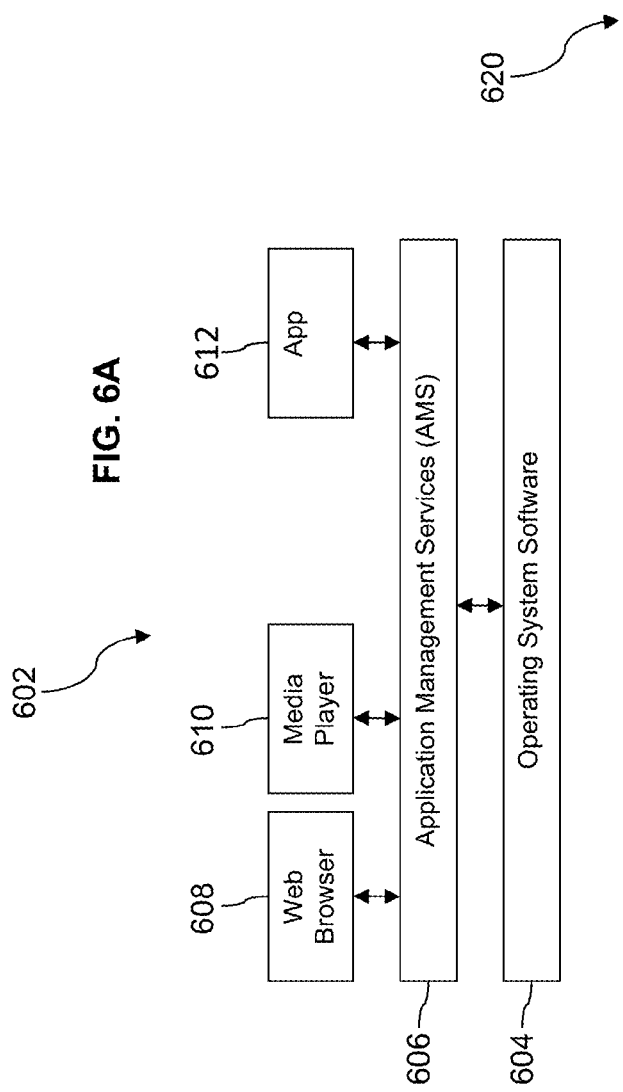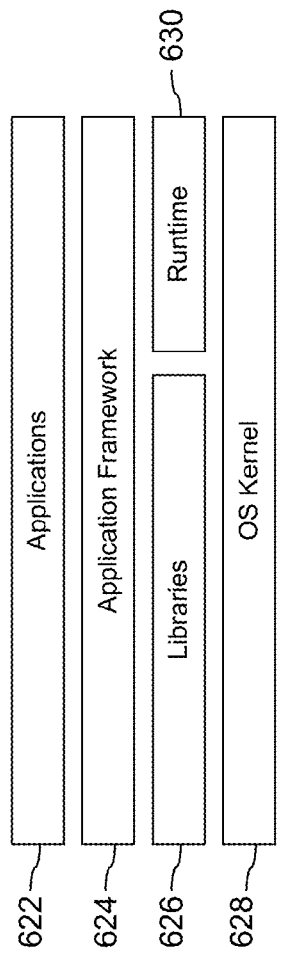

PERSONALIZED PRODUCT PACKAGE RECOMMENDATION ENGINE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Portable electronic devices may vary in capabilities, price point, and compatibility. Telecommunications service providers may offer a range of service plans, devices, and related products across a range of price points and service needs. These items may be widely distributed or sold exclusively by the telecommunications service provider.

SUMMARY

In an embodiment, a method for generating personalized telecommunications package recommendations comprising: receiving, by an application on a server, a plurality of selections of lifestyle attributes, wherein the plurality of selections of lifestyle attributes are received in response to a survey, and calculating, by the application, a total user score for a plurality of package components based on the plurality of selections and based on a first matrix of a plurality of matrixes and a plurality of demographic information, wherein the plurality of demographic information is associated with a plurality of customer accounts, wherein each matrix of the plurality of matrixes comprises a plurality of scores, wherein each score of the plurality of scores corresponds to a package component of the plurality of package components, and wherein each package component of the plurality of package components is one of supported by a telecommunications service provider or associated with a package component supported by the telecommunications service provider. The embodiment further comprising: calculating, by the application, a total telecommunications service provider score for each package component based on a second matrix of the plurality of matrixes, and calculating, by the application, a total component score from at least the sum of the total telecommunications service provider score and the total user score for each component. The embodiment further comprising: recommending, by the application, a plurality of personalized telecommunications packages, wherein an at least one personalized telecommunications package of the plurality of personalized telecommunications packages comprises at least some of the package components, and wherein the recommendation is based on a sum of the total component scores for each component in each personalized telecommunications package of the plurality of personalized telecommunications packages; displaying, by the application, on a graphical user interface, the plurality of personalized telecommunications packages in a ranked order based upon the sum of the total component scores for each component in each personalized telecommunications package of the plurality of personalized telecommunications packages; and receiving, by the application, a request for purchase of at least one package of the plurality of packages.

A system for recommending personalized telecommunications product packages comprising: an electronic device comprising a graphical user interface, wherein the electronic device is in communication with a network; a server, wherein the server comprises a plurality of data stores, and an application, wherein the server is in communication with the network; wherein a first data store of the plurality of data stores comprises a plurality of lifestyle attributes, a plurality of user preferences, a preference/component matrix, and a lifestyle attribute/component matrix, and a feedback matrix, wherein the preference/component matrix comprises a plurality of ratings for a plurality of package components for each user preference of the plurality of user preferences, and wherein the lifestyle attribute/component matrix comprises a plurality of ratings for the plurality of package components for each lifestyle attribute of the plurality of lifestyle attributes. The embodiment further comprising wherein the application: receives a selection comprising at least some of the plurality of user preferences and a weighting factor of each of the selected preferences; receives a selection comprising at least some of the plurality of lifestyle attributes and a weighting factor for each of the selected lifestyle attributes; calculates a total user score for each package component based upon the selected lifestyle attributes and the selected user preferences; and calculates a total telecommunications service provider score for each package component based on the preference/component matrix and the lifestyle attribute/component matrix. The embodiment further comprising wherein the application calculates a plurality of total scores for each package of a plurality of packages based on the total telecommunications service provider score and the total user score wherein each package comprises at least some of the package components; displays the plurality of total scores on the graphical user interface in a ranked order based on the plurality of total scores; and receives a selection, wherein the selection comprises at least one of the plurality of packages.

A method for generating personalized telecommunications package recommendations comprising: building, by a matrix builder application on a server, a lifestyle attribute/component matrix, wherein the lifestyle/component matrix comprises a plurality of information about a plurality of package components, receiving, by an application on a server, a plurality of lifestyle attribute selections, in response to a survey; calculating, by the application, a total user score based on at least the received lifestyle attributes; and calculating, by the application, a total telecommunications service provider score based on at least the lifestyle attribute/component matrix. The embodiment further comprising: calculating, by the application, a total score based on at least the total telecommunications service provider score and the total user score; and displaying, by the application, on a graphical user interface, the total user score for a plurality of packages, wherein each package of the plurality of packages comprises at least some of the package components of the plurality of package components.

In an embodiment, a system for recommending personalized telecommunications product packages comprising: an electronic device comprising a graphical user interface, wherein the electronic device is in communication with a network; a server, wherein the server comprises a plurality of data stores, and an application, wherein the server is in communication with the network; wherein a first data store of the plurality of data stores comprises a plurality of lifestyle attributes, a plurality of user preferences, a preference/component matrix, and a lifestyle attribute/component matrix, and a feedback matrix, wherein the preference/component matrix comprises a plurality of ratings for a plurality of package components for each user preference of the plurality of user preferences, and wherein the lifestyle attribute/component matrix comprises a plurality of ratings for the plurality of package components for each lifestyle attribute of the plurality of lifestyle attributes. The embodiment further comprising: wherein the application: receives a selection comprising at least some of the plurality of user preferences and a weighting factor of each of the selected preferences; receives a selection comprising at least some of the plurality of lifestyle attributes and a weighting factor for each of the selected lifestyle attributes; calculates a total user score for each package component based upon the selected lifestyle attributes and the selected user preferences; and calculates a total telecommunications service provider score for each package component based on the preference/component matrix and the lifestyle attribute/component matrix/The embodiment further comprising: wherein the application calculates a plurality of total scores for each package of a plurality of packages based on the total telecommunications service provider score and the total user score wherein each package comprises at least some of the package components; displays the plurality of total scores on the graphical user interface in a ranked order based on the plurality of total scores; and receives a selection, wherein the selection comprises at least one of the plurality of packages.

In an alternate embodiment, a method for generating personalized telecommunications package recommendations comprising: building, by a matrix builder application on a server, a lifestyle attribute/component matrix; receiving, by an application on a server, a plurality of lifestyle attribute selections; and calculating, by the application, a total user score based on at least the selected lifestyle attributes. The embodiment further comprising: calculating, by the application, a total telecommunications service provider score based on at least the lifestyle attribute/component matrix: calculating, by the application, a total score based on at least the total telecommunications service provider score and the total user score; and displaying, by the application, on a graphical user interface, the total user score for a plurality of packages, wherein each package of the plurality of packages comprises at least some of the package components.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

FIG. 1 is an illustration of matrixes that may be used according to embodiments of the present disclosure.

FIG. 5 shows a block diagram of a mobile device which may be operable for implementing aspects of the present disclosure.

FIG. 6A illustrates a software environment that may be capable of implementing embodiments of the present disclosure.

FIG. 6B illustrates an alternative software environment that may be capable of implementing embodiments of the present disclosure.

DETAILED DESCRIPTION

Figure 2:
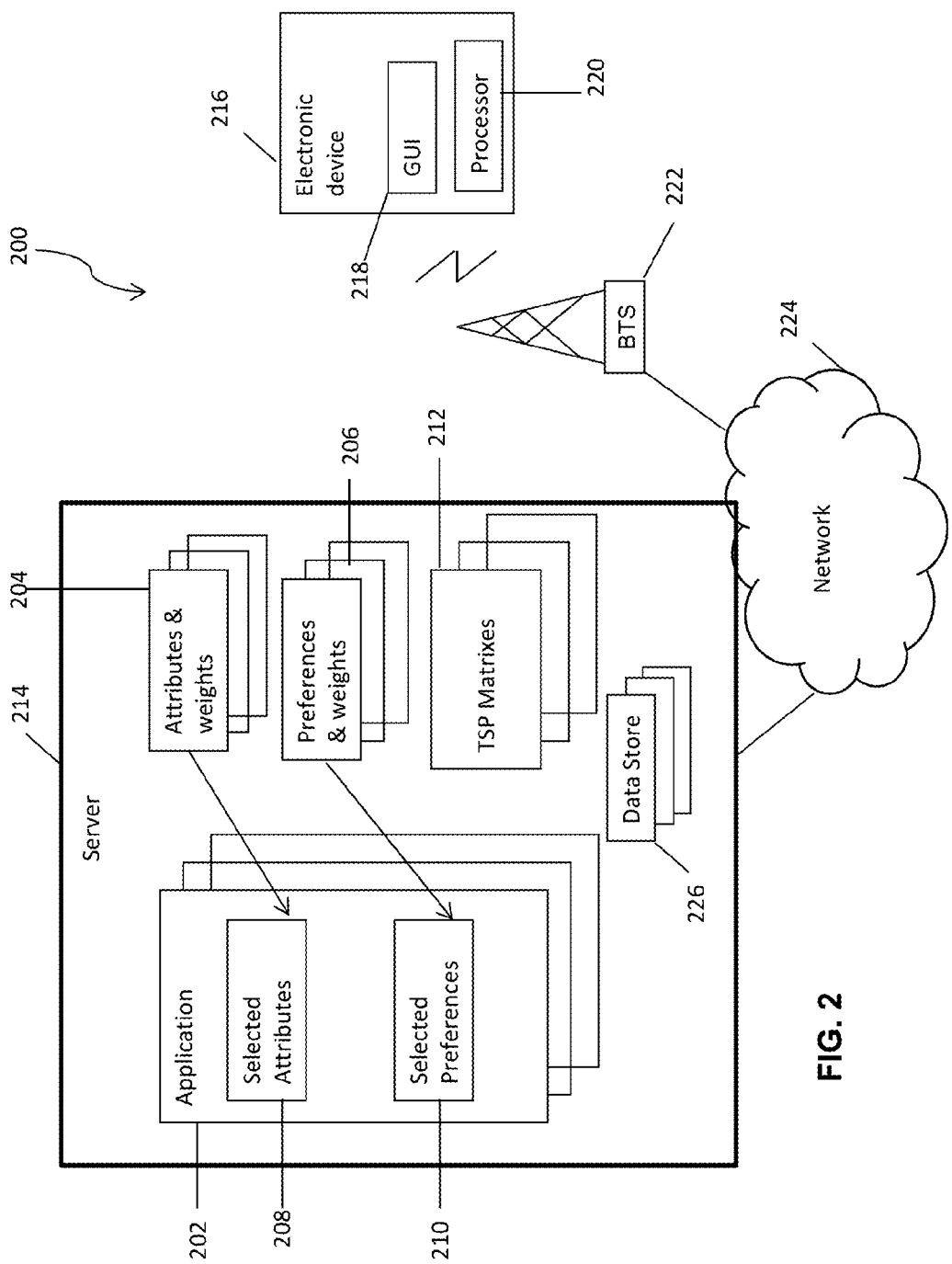
FIG. 2 is an illustration of a system that may be capable of executing according to embodiments of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Customer satisfaction, retention, growth, and profitability may be goals for telecommunications service providers as well as other providers of user-preference and lifestyle-related services. These goals may drive not only the telecommunications industry but also, for example, travel, automotive, beauty, entertainment, and real estate industries. In the telecommunications industry, telecommunications service providers may provide goods and services to customers in categories such as subscription plans, portable electronic devices, services, accessories, and applications. The subscription plans may span across multiple brands, and the services may be related to additional phone privacy, monitoring, location, insurance, and/or other warranties. These goods and services may be rapidly evolving with new and/or updated products being introduced at a pace that may make it challenging for some consumers to keep pace with.

Due to the large number of these items, which may be bundled together for promotional purposes, a customer or potential customer may not be able to fully realize all of the available options or anticipate what packages and/or package components may best suit his or her needs. As such, a personalized recommendation engine is discussed herein that may be able to better satisfy both the customer and the telecommunications service provider. The personalized recommendation engine recommends packages of components by taking into account not only the functionalities and preferences identified by the customer, but also the functionalities and preferences that a user may not yet have anticipated.

Conventionally, a user may be asked to answer a series of questions in order to determine what type of device or plan is best-suited to his or her needs. In one example, the user may be an active, outdoorsy person who may indicate that a rugged (ruggedized) device is needed. The system may start with a pool of all portable electronic devices supported by the telecommunications service provider and the user may select the type of device they desire. Upon the user's selection of a rugged device, the system removes devices from the pool that are not ruggedized devices. Removing those devices from the pool that are not rugged devices may mean that the removed devices would not be displayed to the user to select for purchase. As such, using this conventional filtering method, devices that may comprise all of the other capabilities that the user seeks as far as performance, subscription preferences, and other capabilities may be filtered out simply based upon this one criterion of ruggedness. Therefore, when this conventional filtering process is used, the user may be presented with fewer device options than originally present in the pool of devices because this filtering process removes devices from the pool. In contrast, the systems and methods described herein relate to the use of a personalized recommendation engine to recommend packages of components to a user and ranks the entire pool of components instead of removing components from the pool. The personalized recommendation engine takes into account a plurality of lifestyle factors and ranks the entire pool of components based on at least user input instead of removing components from the pool and creates personalized packages from the pool of ranked components to recommend to users.

In an embodiment, the personalized recommendation engine starts with a pool of components in categories such as portable electronic devices, accessories, subscription plans, services, and applications. In response to input from a user or a customer care representative, the personalized recommendation engine ranks each component in the pool of components and recommends packages of components based on the rankings of each component. The personalized recommendation engine discovers the user by getting to know them through gathering insights about his or her preferences and lifestyle. In some cases, information may be retrieved about a user's device use history across one or more devices. Information, such as demographic information, may also be retrieved from account information for existing customers. The information retrieved may be used to rank each component in the pool of components, which may also be referred to as package components. The ranked components may be combined into personalized packages to recommend to the user, these packages may comprise components from some or all of the component categories such as portable electronic devices, accessories, subscription plans, services, and applications. In an embodiment, a personalized package comprises at least three of a portable electronic device package component, a subscription plan package component, an application package component, an accessory package component, and a service package component. In an embodiment, a personalized package comprises at least four of a portable electronic device package component, a subscription plan package component, an application package component, an accessory package component, and a service package component. In some contexts, a personalized package may be referred to as a personalized telecommunications package.

In an embodiment, the personalized packages may be displayed to the user for selection, for example, in a ranked order beginning with the package most likely to satisfy the user's identified needs as well as his or her unanticipated needs. Referring back to the example of a user who desires or needs a rugged device, the personalized recommendation engine may recommend a plurality of personalized packages in a ranked order. The personalized packages may include devices that are ruggedized as-sold, as well as packages that include devices that are not ruggedized as-sold and components that can be used to ruggedize devices that are not rugged as-sold. This way, a particular user need or needs may be satisfied by the personalized recommendation engine by ranking an entire pool of components instead of filtering out components.

In another example, a user may be interested in a device with controllable/restricted access options. The device may be, for example, for a child or a teenager's use, or for an adult who may wish to block or restrict some incoming calls or data. A conventional filtering system used for device selection would likely remove the devices from the pool of components that did not come with this feature, devices that may otherwise satisfy the user's needs and/or wants. In contrast, the personalized recommendation engine takes into account this requested blocking/restriction/access feature and may recommend packages that satisfy this feature request. These personalized package recommendations may include devices that may not come with that type of blocking/restriction/access feature but that, in combination with subscription plans, applications, accessories, and/or services may satisfy this customer request.

In an embodiment, the method used to make a personalized package recommendation may also include a weighting. This may include the telecommunications service provider providing input as to the expected revenue, inventory level, serviceability, compatibility, and reliability of a package component. This input may be used in conjunction with the user's input to recommend personalized packages. This is discussed in detail below.

In an embodiment, using the personalized recommendation engine, a user is offered the opportunity to select from a plurality of user preference and lifestyle attribute options. This may be referred to as presenting a survey to a user. This survey may be presented to the user by a customer care representative at a retail location or over the phone, or the user may take this survey on their own using a stationary or portable electronic device or a kiosk. The survey may comprise questions that relate to general aspects of the customer's life. Survey questions may ask if the customer has children and their ages, if their hobbies are active outdoor activities, if they travel frequently for business, if they have elderly parents who they worry about, and the like. The questions may not relate directly to specific electronic device or wireless communication services. The personalized recommendation engine, however, may be able to analyze disparate behavior or lifestyle attributes revealed by the customer's answers to the survey questions to infer device features and/or communication services that would be desired by the customer.

A filtering system that may be conventionally used to display products to a user removes components from a pool based on user input. In contrast, a personalized recommendation engine keeps all of the components in the pool and ranks each component as to how well it matches up with the user preferences and lifestyle attribute selections. The components may also be scored based upon rankings and/or scores assigned by a telecommunications service provider's scoring. The components are ultimately packaged by the personalized recommendation engine into a plurality of packages to recommend to the user for purchase. In some embodiments, feedback from previous users of the personalized recommendation engine who made purchases may also be used to develop scores for each component in the pool of components. Each component has a total score based upon at least one of user input, telecommunications service provider input, and customer feedback, these total scores are used to recommend personalized packages.

In an embodiment, the personalized recommendation engine may send notifications to users who have made previous purchases when, for example, a new model of a package component is available, a new color or style of a package component is available, or when a package component is being offered at a discounted sales price. New components or styles of components may be introduced as they become available, or may be introduced in a pre-sale to users who have previously purchased packages comprising these items.

The personalized recommendation engine makes package recommendations based upon the defined needs of the user as well as needs and/or functionalities that the user may not have anticipated a need for. For example, a user may have identified that he or she is looking for a family plan and that he or she has teenagers, but the user may not have identified social media applications as a desired feature. The personalized recommendation engine may take the user's input and recommend packages that include social media applications, devices capable of executing those applications, and subscription plans suited to mid-to-high levels of traffic and data consumption resulting from those applications.

From the telecommunications service provider's perspective, it may be desirable to up-sell add-ons to devices and subscription plans such as services, accessories, and applications. However, this may also be desirable from a customer's perspective because a package may be priced so as to make an item or items such as a device more desirable due to affordability, expanded capability (how well a component performs), or expanded functionalities (what functions each component performs). In some embodiments, a discount may be applied to some or all of the items in a recommended personalized package. This discount may be applied on a sliding scale depending upon how many items are purchased, the value of items purchased, previous package or component purchases, subsequent component or package purchases, or combinations thereof.

In an embodiment, the personalized recommendation engine uses input from a user that may be entered, for example, at a kiosk, using a portable electronic device, using an application, using a web interface, or combinations thereof. A user may input his or her own information, or a customer care representative may input the information. In some cases, the input may be a combination of both user input and customer care representative input. This user input may consist of at least one of two main categories, user preferences and lifestyle attributes, both of which are discussed in detail below. An algorithm used by the personalized recommendation engine may also use input from the telecommunications service provider. In some embodiments, the personalized recommendation engine may also use customer feedback input from customers who have used the personalized recommendation engine for package purchases. This customer feedback information may be combined with the preferences and lifestyle attributes of those customers to make recommendations. Depending upon the embodiment, the customer feedback information may be used in addition to, or instead of, the telecommunications service provider's input.

In an embodiment, a pre-defined list of a plurality of user preferences and a pre-defined list of a plurality of lifestyle attributes are stored on a server, for example, in a data store, and presented to a user directly or with the assistance of a customer care representative. These pre-defined lists may be updated on a periodic basis as new components are introduced and/or phased out. The user selects from the plurality of user preferences and from the plurality of lifestyle attributes. In some embodiments, the user may assign an importance weighting to the selected user preferences and lifestyle attributes, and in other embodiments the importance weighting may be assigned automatically for the user preferences as discussed below. The importance weighting may be multiplied by the corresponding value from a matrix for the user preference or the lifestyle attribute for a pool of components. The corresponding values for each component of a pool of components are determined, summed, normalized, and weighted, as illustrated below. An importance weighting may range from 0.0-2.0 or any other numerical range depending upon the statistical discretion desired for the results.

The telecommunications service provider may generate and store a plurality of matrixes. These matrixes comprise a plurality of corresponding values for the pre-defined lists of user preferences and lifestyle attributes. The matrixes may be periodically updated and may be generated based upon experts' opinions of components and/or based upon user feedback from users who have previously purchased packages and package components using this system. In some embodiments, the user feedback may be correlated to the selected user preferences and lifestyle attributes for the user providing feedback so that the user feedback is used for customers or potential customers who made similar selections. It is appreciated that, while the personalized recommendation engine recommends packages of components, it may also rank each component and a user may browse and select from the individual rankings. For example, if a user sees a package component in a recommended package that they would find especially useful, the user may want to purchase an extra component or see if the same component manufacturer produces other, similar products.

FIG. 1 is an illustration of matrixes that may be used according to embodiments of the present disclosure. In some embodiments, the telecommunications service provider may have a matrix or matrixes that rate devices, accessories, subscription plans, services, and applications according to reliability, serviceability, and compatibility. The reliability of the device may be based on the number of complaints and/or returns for a particular device over a period of time after the device is introduced and/or after the device undergoes an upgrade. The serviceability of a device may reflect the ability of the telecommunications service provide to service the device. The compatibility may be based upon how many other devices an accessory is compatible with, and/or how many types of service plans a particular device is supported by.

The telecommunications service provider, by way of experts in some embodiments, provides a rating for each package component of a pool of package components based upon the ability of the package component to satisfy a plurality of selected user preferences 106 and lifestyle attributes 110. A matrix of user preferences versus components 100 is shown in FIG. 1, and a matrix of lifestyle attributes 110 versus components 102 is also shown in FIG. 1. Matrixes 100 and 102 may be generated by the telecommunications service provider or by a third party and may be stored on a server or in a data store on a server by the telecommunications service provider or another authorized third party. The matrix 100 of preferences versus components may list the possible user preferences 106 as discussed in detail below. The matrix 100 may relate to the characteristics and/or capabilities of a plurality of components, for example, a plurality of portable electronic devices 104. While portable electronic devices are used in FIG. 1, it is appreciated that the same matrixes may be generated to store similar information for all components including applications, accessories, subscription plans, and services. In the example in FIG. 1, user preferences 106 such as flip-phone, smartphone, virtual keyboard, attached keyboard, and slider phone may be listed down one column and the plurality of portable electronic devices 104 supported by the telecommunications provider may be listed across a top row. While the example of devices are used in FIG. 1 for matrixes 100 and 102, it is understood that the values contained in the matrixes are what matters and what is used in the calculations discussed below. While in some embodiments the matrixes 100 and 102 may look as indicated in FIG. 1, in other embodiments the matrixes may have codes or other indicators in the fields such as 104, 106, and 110 that reflect rankings for various aspects of components. It is understood, for example, that the matrixes may comprise values only and may not, for example, comprise "Device 1," "Device 2," etc., column names or "flip-phone," "Smartphone," etc., row names.

In an embodiment, user preferences and importance weightings may be selected by the user, this is discussed in detail below. In an embodiment, each device of the plurality of portable electronic devices 104 has value 108a or 108b stored in the matrix 100. This value 108a or 108b may indicate whether or not a particular portable electronic device of the plurality of portable electronic devices 104 satisfies the selected preference. In FIG. 1, values 108a and 108b are illustrated by either a "0," which may indicate the corresponding device does not have the selected preference, or a "10," which may indicate that the corresponding device does have the selected preference. The user preferences may be described in some embodiments as a binary feature, where the selected option for a phone type, keyboard type, or other preference as discussed below is either available on a particular device, and hence the device has the selected preferences, or is not available, and hence the device does not have the selected preferences. In alternate embodiments, letters, different numbers, symbols, or combinations thereof may be assigned as values 108a and 108b.

In one example, a user preference may be what type of phone a user wants, that is, whether the user desires a flipphone, smartphone, or slider phone, and a lifestyle attribute may be whether a user is interested in cooking or sports and, if so, how interested they are in that topic (weighting). In one example using FIG. 1, Device 3 of the plurality of portable electronic devices 104 is a slider phone with an attached keyboard, as indicated by the "10s" in those categories of matrix 100. In another example, Device 5 is a smartphone that is also a slider phone that has both an attached keyboard and a virtual keyboard, again, as indicated by the "10s" in those categories of matrix 100. In contrast to conventional filtering programs, regardless of how a user's selected preferences and importance of preferences are chosen, all the devices of the plurality of portable electronic devices 104 remain available for recommendation to the user and are ranked to potentially become part of a recommended package. No devices of the plurality of portable electronic devices 104 are removed from the pool that package components may be culled from. The matrix 100 may be used to help make the package recommendations by ranking the plurality of portable electronic devices 104, in some embodiments as part of a package, to the user based upon at least the user's selections.

Turning back to FIG. 1, matrix 102 illustrates a matrix that may be stored on a server of the telecommunications service provider or a third party. This matrix 102 may comprise a plurality of lifestyle attributes 110 ranked/scored for the plurality of portable electronic devices 104 supported by the telecommunications service provider. The matrix 102 scores a plurality of components such as portable electronic devices 104 to each of the lifestyle attributes. The scores 112 may be, for example, on a scale of 1-10 where the number 112 used to score the device may indicate how well the portable electronic device 104 or other component is suited to meet the selected lifestyle attribute according to expert scoring and/or peer customer scoring by peers who may have previously purchased packages or package components. The plurality of portable electronic devices 104 in matrix 102, just as in matrix 100, comprises all of the devices from the pool of components supported by the telecommunications service provider. The plurality of lifestyle attributes 110, discussed in detail below, may comprise selections for a user to make such as whether they are a cooking enthusiast, sports enthusiast, coupon enthusiast, as well as whether they use photo-sharing and/or video chat applications. A user may select lifestyle attributes from the plurality of lifestyle attributes and weight each attribute by selecting an importance weighting. This importance weighting may be a number, symbol, letter, or combination thereof that may ultimately be converted to a numerical value for use in the algorithm disclosed herein.

In an embodiment, the information in matrixes 100 and 102 is generated by the telecommunications service provider, for example, by experts. In alternate embodiments, the information may be generated by third-parties such as previous purchasers of packages or components using the personalized recommendation engine. In some embodiments, more than one set of matrixes may be maintained, wherein a first set may be generated by component experts such as the OEM or telecommunications service provider, and wherein a second set may be generated based upon customer feedback from customers who have made previous purchases using the personalized recommendation engine.

FIG. 2 is an illustration of a system 200 that may be capable of executing according to embodiments of the present disclosure. FIG. 2 illustrates a system 200 that comprises a server 214, and an electronic device 216 that comprises a graphical user interface 218 and a processor 220. The server 214 may comprise a plurality of selectable stored lifestyle attributes and importance weights 204 that a user may select from. The server 214 may also comprise an application 202 and a plurality of selectable stored user preferences and weights 206. In an embodiment, the application 202 may also be referred to as a personalized recommendation engine 202. It is appreciated that this information 204 and 206 on the server may be stored in one or more data stores 226 on the server. The server may also comprise a plurality of telecommunications service provider matrixes 212 that contain information for each component from the pool which may include matrixes similar to the matrixes 100 and 102 discussed with reference to FIG. 1. The personalized recommendation engine 202 may score and rank each individual component from a pool of components and recommend packages of components to a user. The personalized package recommendations made by the personalized recommendation engine 202 may be based upon the user's input in the form of user preferences and/or lifestyle attributes and the telecommunications service provider's input. In some embodiments, customer feedback from previous purchasers of packages based upon the user preferences and/or lifestyle attributes associated with previous purchasers may also be used by the personalized recommendation engine 202. The personalized recommendation engine 202 starts with a catalog, pool, or suite of potential package components. The package components may be in categories such as devices, accessories, subscription plans, applications, and services. Each component is scored as described below and ranked. The personalized recommendation engine 202 puts together packages of components from the ranked components to recommend personalized packages to the user for purchase.

The system 200 may further comprise a network 224, and a base transceiver station 222 that is in wireless communication with the electronic device 216. In an embodiment, the electronic device 216 may be a portable electronic device such as a tablet, mobile phone, laptop computer, mobile kiosk, or a personal digital assistant. In another embodiment, the electronic device 216 may be a stationary electronic device such as a kiosk or desktop computer. The plurality of user preferences and weights 206 stored on the server 214 may be selected as discussed below with respect to FIG. 3. Each selected user preference may have an associated importance weighting assigned by the party making the selection based upon how relevant the user preference is to his or her telecommunications service use and habits. The plurality of lifestyle attributes and importance weights 204 stored on the server 214 may be selected as discussed below with respect to FIG. 3. Each selected lifestyle attribute may have an associated importance weighting selected by the user. This importance weighting may be chosen based upon how relevant the user selecting the lifestyle attributes considers that lifestyle attribute to be to his or her telecommunications service use and habits.

Figure 3:
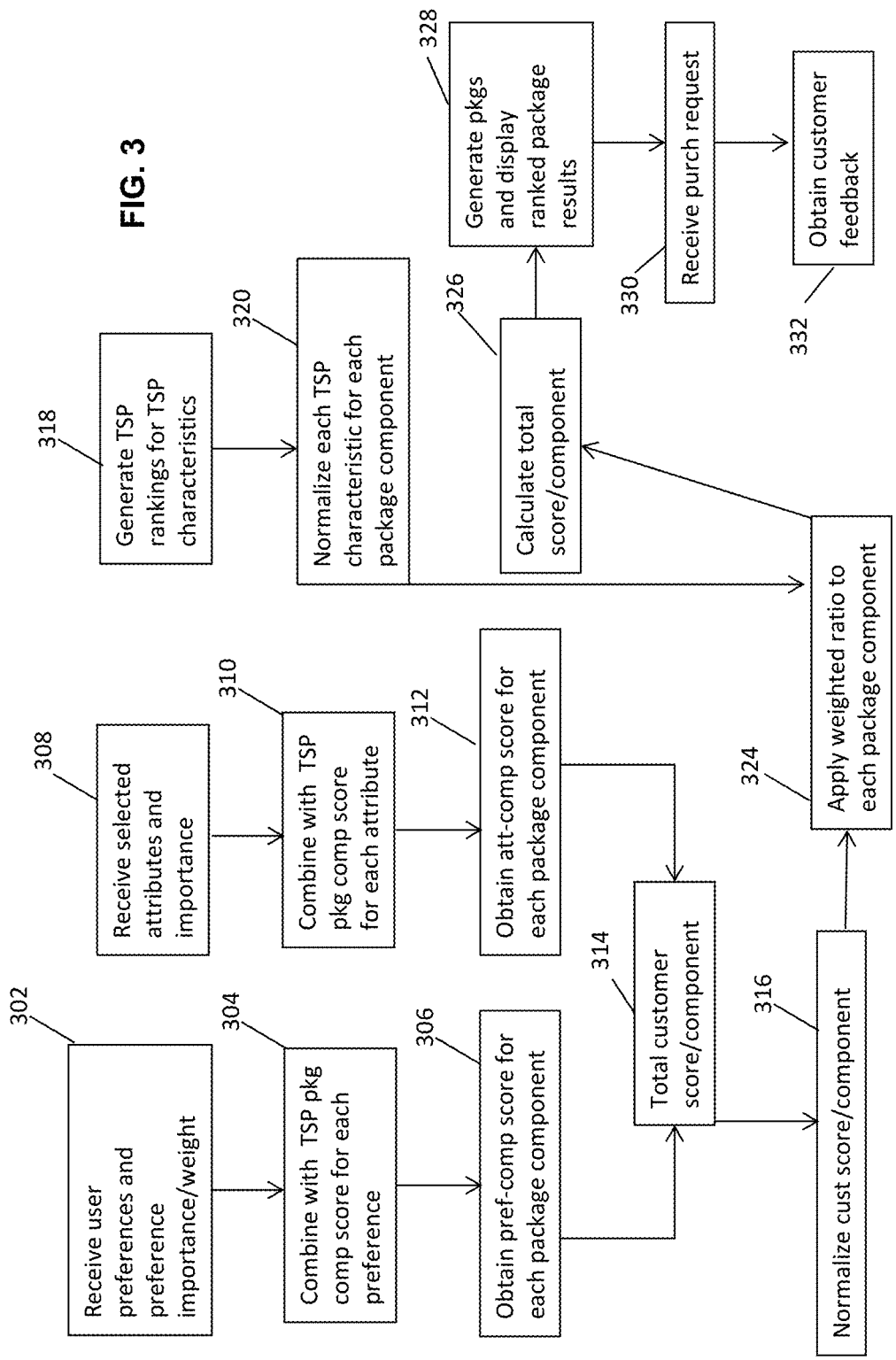
FIG. 3 is a flow chart of a method of recommending personalized packages according to embodiments of the present disclosure.

FIG. 3 is a flow chart of a method of recommending personalized packages according to embodiments of the present disclosure, FIGS. 2 and 3 are discussed below. At block 302, the application 202 on the server 214 may receive a plurality of selected user preferences 210 from a plurality of user preferences and weights 206 stored on the server 214. At block 304, the selected preferences 210 may be combined with the corresponding values from the matrix 100 from FIG. 1. At block 306, a preference-component score is obtained for each package component including portable electronic devices, applications, accessories, subscription plans, and services. In an embodiment, this preference-component score may be obtained by combining the user's preference, weighting, and corresponding component in a telecommunications service provider's (TSP) matrix of the plurality of matrixes 212 such as matrixes 100 and/or 102 from FIG. 1.

At block 308, the application 202 receives a plurality of selected lifestyle attributes 208 and an associated importance weighting for each attribute selected from the plurality of lifestyle attributes and importance weights 204. In an embodiment, the selected importance weighting associated with each selected lifestyle attribute 208 may be a multiplier that may be applied to the corresponding component in a TSP matrix of the plurality of matrixes 212 such as matrix 100 from FIG. 1. At block 310, the plurality of selected attributes may have their associated importance weights multiplied by the values for a plurality of devices in a matrix that reflects how well each device (or other component) can satisfy the selected lifestyle attribute. At block 312, a lifestyle attribute-component score is obtained for each package component including portable electronic devices, applications, accessories, subscription plans, and services. In an embodiment, this lifestyle attribute component score may be obtained by combining the lifestyle attribute weighting, and the corresponding component in a TSP matrix of the plurality of matrixes 212 such as the matrix 102 from FIG. 1.

In an embodiment, the multiplier that reflects the selected importance weighting may be 0.0, for a selected user preference 210 or lifestyle attribute 208 that is not important to the user, 1.33 for selected user preferences 210 or selected lifestyle attributes 208 that are slightly important to the user, 1.67 for selected user preferences 210 or selected lifestyle attributes 208 that are slightly more important to the user, and 2.00 selected user preferences 210 or selected lifestyle attributes 208 that are considered very important to the user. It is appreciated that other multipliers and/or indicators may be used depending upon the desired statistical discretion.

In an embodiment, if a user does not select certain lifestyle attributes of the plurality of lifestyle attributes and importance weights 204 at block 308 or certain user preferences of the plurality of user preferences and weights 206 at block 302, a default value importance of 0.0 may be assigned by the application 202. In alternate embodiments, if a user does not select certain lifestyle attributes of the plurality of lifestyle attributes and importance weights 204 at block 308 or certain user preferences of the plurality of user preferences and weights 206 at block 302, the importance weighting may be predetermined to be set at another value. In yet another embodiment, the user may receive a prompt (not pictured) to select the skipped lifestyle attributes of the plurality of lifestyle attributes and importance weights 204 at block 308 or skipped user preferences of the plurality of user preferences and weights 206 at block 302.

In one embodiment, the plurality of user preferences and weights 206 can be thought of as binary preferences and may comprise what type of device the user is looking for, who the device is for (individual or a shared/family device), the operating system desired, the device style, and the basic features. The device style may comprise options such as a basic feature phone, eco-friendly phone, flip-phone, ruggedized/military grade, slider, or smartphone. The device feature preferences may comprise options such as 3G, 4G, camera, direct connect, download/store music, email, expandable memory, removable memory, GPS, hearing aid compatibility, international coverage, physical keyboard, virtual keyboard, large text display, linked contacts, mobile hotspot, no contract, WiFi, video conferencing, music, radio, water resistant, removable battery, TTY compatibility, and video/recording capability.

In an embodiment, the lifestyle attributes may fall under categories such as home/family, social, entertainment, spending tendencies, work, and hobbies. Some of the lifestyle attributes may overlap or may have different lifestyle attribute aspects asked about under different categories. For example, email use may be asked about under both the social and work categories. Under home/family, lifestyle attributes such as number of children, age of children, marital status, pet-ownership status, other devices in the home, activities that anyone in the home is engaged in (sports, arts, etc.). The social category may comprise lifestyle attributes such as social networks that the user participates in, social networks that others in the home/family participate in, social calendar use, personal email use, personal contacts use, and personal file-sharing which may include photo-sharing. The work category may comprise lifestyle attributes such as work calendar use, voice-services use (i.e. conference calling or video conferencing), work-email use, business travel, file-sharing, finance tracking, mobility, whether the user is a business owner, and work-contacts use. The entertainment category may comprise lifestyle attributes such as if music and movies are downloaded, streamed, and/or accessed from a cloud, as well as the device's use for reading, audio books, gaming, participating in sports, and watching sports. The spending tendencies category may comprise lifestyle attributes such as if the user is budget conscious, use of coupons, which may also overlap with the hobbies category, areas of budget-consciousness, temporary or unemployment status, student status, and exchange student/short term US visitor status. The hobbies category may comprise video-making, video-sharing, video chat, outdoors enthusiast, cooking enthusiast, coupon enthusiast, health and wellness, and arts.

Turning back to FIGS. 2 and 3, at block 314, the preference-component scores obtained at block 306 and the lifestyle attribute-component score obtained at 312 may be combined to obtain a total customer score for each component. At block 316, the total customer score obtained at block 314 may be normalized. In an embodiment, the formula used for normalization may be the total customer score obtained at block 314 multiplied by 100 (total device score×100) divided by the number of user preferences and lifestyle attributes available for selection. This number may also be multiplied by a constant, indicated by the number 20 in the example below. In one example this may be expressed as:

Normalized total customer score=(total device score× 100)/([number of user preferences+number of lifestyle attributes]*20).

At block 318, a plurality of telecommunications service provider (TSP) scores for the package components may be generated. These scores for each component may be based upon a plurality of criterion for each component including reliability and serviceability. In some embodiments, this information is stored in a matrix of the plurality of TSP matrixes 212 on the server 214 as discussed in FIG. 2. The reliability of a package component may be based upon returns, refunds, replacements, service level, or service calls related to the package component. The serviceability of a package component may be based upon the telecommunications service provider's ability to troubleshoot the package component. At block 320, the TSP score for each package component may be normalized, for example, using the following formula:

$$\text{Normalized TSP score}=(\text{TSP score}*100)/((\text{number of criteria used to determine TSP score})*20)$$

At block 324, a weighted ratio may be applied to each of the normalized customer score from block 316 and the normalized TSP score from block 320. In one example, the weighted ratio has two parts that sum to 1.0, a first portion of the ratio, for example 0.95, may be applied to the normalized customer score from block 316 and a second portion of the ratio, for example 0.05, may be applied to the normalized TSP score from block 320. At block 326, the scores calculated from applying the weighted ratio to the TSP component score and the customer component score at block 324 may be summed to calculate a total score for each component. A plurality of package suggestions are generated at block 328 based upon the total scores calculated at block 324 for each component. In an embodiment, the total scores may be calculated according to the following equation:

$$\text{Total score}=(\text{normalized TSP score}*0.05)+(\text{normalized customer score}*0.95).$$

At block 328, a plurality of package options are generated and displayed, for example, on the graphical user interface 218. Each package option of the plurality of package options comprises a plurality of package components and an associated total score which may be the sum of the scores calculated at block 326 for each component, the plurality of package options may be displayed and/or ranked in descending order by package score. In some embodiments, individual components' scores may also be displayed in a manner such as tabbed lists or expandable lists by category which the user may expand if desired. In an embodiment, each package may be assembled based upon the total score calculated at block 326 for each component. The highest-rated component from each category such as devices, accessories, subscription plans, services, and applications may be selected and packaged together, then the second-highest rated component from each category, and so on. In an alternate embodiment, components with varying ratings may be packaged together to meet not only the use habits identified by the user but also to meet unanticipated needs of the user. Some packages may comprise at least one component from each of the devices, applications, subscription plans, accessories, and services, and some packages may only comprise two total components.

In one embodiment, the purchase of additional components from the components in a recommended package, for example, extra car chargers, may also be discounted with the purchase of a package. Telecommunications service providers may also consider factors such as performance history, compatibility with other devices and/or accessories, and technical compatibility in addition to user input to recommend not just a single component but rather a package of components to a user. The personalized recommendation engine discussed herein scores an entire pool of components that could potentially be packaged together in various combinations and does not remove any components from the pool based upon user input or telecommunications service provider input. In some embodiments, an exception to keeping all of the components in the pool may be if a component is recalled or otherwise discontinued. In that event, a recalled component may be removed from the pool and a discontinued component may be removed or discounted to promote inventory turnover. The pool of components may be added to at any time as new components are made available.

In one example, a user selects lifestyle attributes A, B, and C, and gives each attribute an importance weighting and the selections are received at block 308 by the application 202. The importance weighting may be in the form of a number of symbols such as stars or exclamation points, and may translate to a numerical value. An importance weighting may be 0.0 (not important/not selected), 1.33 (somewhat important), 1.67 (important), or 2.0 (very important). If an importance weighting of 1.33 is selected for A and B and 2.0 is selected for C, the calculation may proceed as follows. These values for the importance weighting are multiplied at block 312 by the values for a plurality of devices in a matrix that reflects how well each device (or other component) can satisfy the selected lifestyle attribute. If Device 1 has a rating/ranking/score of 6 for attribute A, the user score for attribute A for Device 1 for that user would be:

$$\text{Attribute } A \text{ score}=\text{importance weighting}\times\text{matrix value}=(1.33*6)7.98.$$

If Device 1 has a rating/ranking/score of 9 for attribute B, the score for attribute B for Device 1 for that user would be (1.33*9)=11.97. The score for attribute C may be calculated in a similar fashion if attribute C has a rating/ranking/score of 8, (2.0*8)=16. The total attribute-component score for Device 1 is obtained at block 312 may be the sum of all of the selected attributes, in this case, two attributes are used for illustrative purposes but any number of lifestyle attributes may be selected.

$$\text{Total attribute-component score}=\text{attribute } A \text{ score}+\text{attribute } B \text{ score}+\text{attribute } C \text{ score}=(7.98+11.97+16)=35.95.$$

In some embodiments, calculations may be rounded to the nearest whole number or predetermined number of digits. In other embodiments, the total component score calculated at block 314 may be referred to as a total user component score because it may be calculated for potential package components other than devices. This score may comprise the scores for lifestyle attributes for a particular component such as a device, accessory, service, subscription plan, and application. This score may also comprise the scores for selected user preferences which may be calculated at blocks 302, 304, and 306 in a similar fashion using matrix values from a matrix as discussed in detail with respect to FIG. 1.

In some embodiments, a telecommunications service provider score may also be calculated at blocks 318, 320, and 326. This score may take a plurality of factors such as reliability, compatibility, and serviceability for each component at block 318 and generate a score for each component of the pool of components based upon these telecommunications service provider factors. In one example, these factors may each receive a % weighting (totaling in 100%) at block 318 which is then applied to the corresponding value for the user preference or the lifestyle attribute for a pool of components from a matrix maintained by the telecommunications service provider. If Device 1 has a reliability score of 8, and reliability has a weighting of 20%, and an compatibility score of 4 where compatibility is weighted 10%, the total telecommunications service provider (TSP) score for the device assuming only those two criteria calculated at block 318 would be:

Total TSP score=[(8*0.2)+(4*0.1)]=2.0.

It is understood that one or more than one criteria may be used by the telecommunications service provider for these calculations, depending upon the embodiment. In an embodiment, the total user score of 19.95 may be normalized at block 316. In an example where the only attributes/preferences are attributes A, B, and C this formula would give the result of:

[35.95*100/((total number of preferences+total number of lifestyle attributes)*20)]=35.95*(100/(3*20))=59.92.

In an embodiment, the value of "20" may reflect a constant value that may vary depending upon embodiment, as may the total number of preferences and the total number of lifestyle attributes may also vary depending upon the embodiment.

The total device score may be normalized similarly at block 320, assuming there are only two criteria:

2.0*(100/40)=5.

Subsequent to normalization, in some embodiments, the total user score may be weighted, for example, by a factor of 0.95 and the total telecommunications provider score weighted by a factor of 0.05. The two weighted scores may be added together to obtain a total component score at block 326. In that example, the total component score would be:

59.92(0.95)+5(0.05)=57.17

This total component score may be used to recommend personalized packages to a user at block 328, and may be used to rank this component with respect to other devices. The total component score may also allow each component within the entire pool and within each category to be ranked not only to potentially be part of a package, but also, in some embodiments, to be displayed in a ranked order with all of the other pool components in the same category. This total component score may be calculated at block 326 for each and every component of the pool of components. In an embodiment, no components are removed from the pool based upon the user or telecommunications service provider rankings. A plurality of personalized packages is recommended to the user based upon the component rankings for each of the components in the pool, since, unlike a filtering system, components are not removed from the pool based upon user input. The packages may be presented to the user in a ranked order based upon the likelihood that the user's needs and expectations would be met by a particular package. In some embodiments, the user may also be presented with rankings for each category of component, and/or may have the option to multiply the number of components in a package, for example, in order to obtain an extra device charger or an additional case or protector in a different color or style. The package price may comprise discounts as compared to the price of each component if purchased alone, and further discounts may be available for additional components.

Turning back to FIG. 3, at block 330 the application 202 receives a purchase request for at least one of the package recommendations generated at block 328. At block 332, customer feedback may be obtained regarding the purchase at block 328, this feedback may be obtained at a predetermined period or series of intervals subsequent to the purchase. In an embodiment, the customer feedback obtained at block 332 may be used in the matrixes in FIG. 1, and in an alternate embodiment, a separate matrix may be generated and stored on the server 214 that comprises the customer feedback data. In an alternate embodiment, the customer feedback data may be used in addition to or instead of the matrixes 100 and 102 as discussed in FIG. 1. This customer feedback data obtained at block 332 may be used to recommend package components and put together packages.

Figure 4:
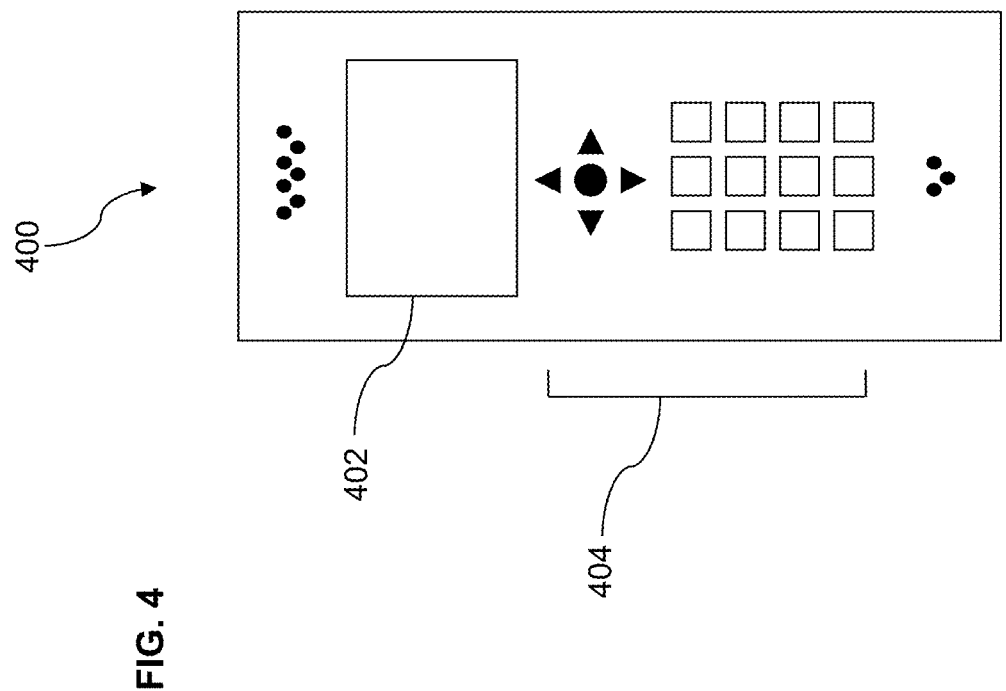
FIG. 4 depicts a mobile device which may be operable for implementing aspects of the present disclosure.

FIG. 4 depicts the mobile device 400, which may be operable for implementing aspects of the present disclosure, but the present disclosure should not be limited to these implementations. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

FIG. 5 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth® interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

FIG. 6A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 6A are a web browser application 608, a media player application 610, and application 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. FIG. 6B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 7:
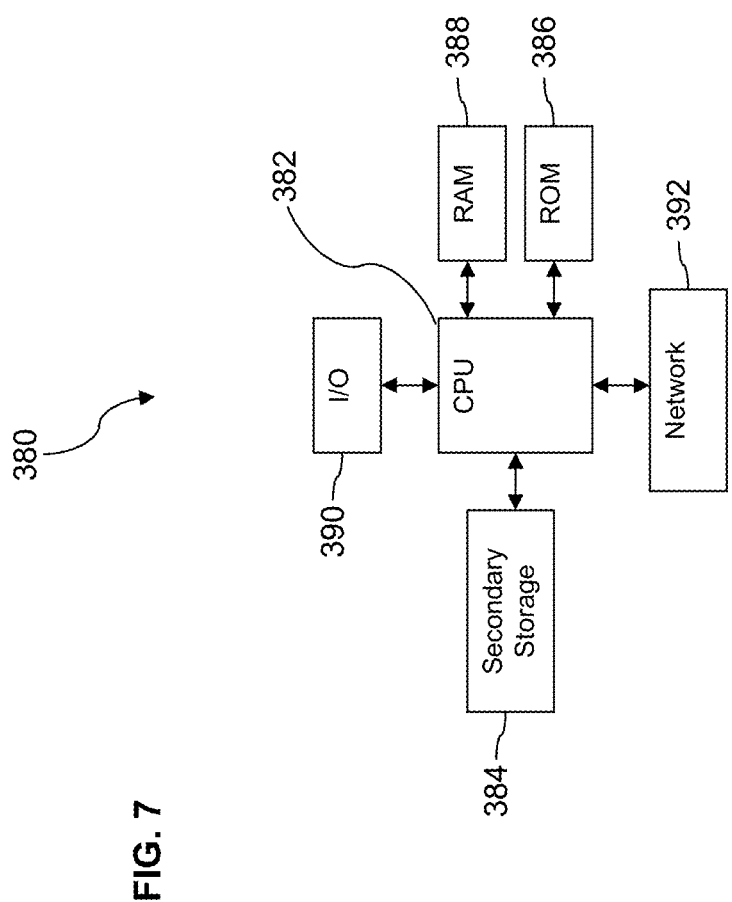
FIG. 7 illustrates an exemplary computer system that may be suitable for implementing the several embodiments of the disclosure.

FIG. 7 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for generating personalized telecommunications package recommendations comprising:

receiving, by an application on a server, a plurality of selections of lifestyle attributes, wherein the plurality of selections of lifestyle attributes are received in response to a survey;

calculating, by the application, a total user score for a plurality of package components based on the plurality of selections and based on a first matrix of a plurality of matrixes and a plurality of demographic information, wherein the plurality of demographic information is associated with a plurality of customer accounts, wherein each matrix of the plurality of matrixes comprises a plurality of scores, wherein each score of the plurality of scores corresponds to a package component of the plurality of package components, and wherein each package component of the plurality of package components is one of supported by a telecommunications service provider or associated with a package component supported by the telecommunications service provider;

calculating, by the application, a total telecommunications service provider score for each package component based on a second matrix of the plurality of matrixes;

calculating, by the application, a total component score from at least the sum of the total telecommunications service provider score and the total user score for each component;

recommending, by the application, a plurality of personalized telecommunications packages, wherein an at least one personalized telecommunications package of the plurality of personalized telecommunications packages comprises at least some of the package components, and wherein the recommendation is based on a sum of the total component scores for each component in each personalized telecommunications package of the plurality of personalized telecommunications packages;

displaying, by the application, on a graphical user interface, the plurality of personalized telecommunications packages in a ranked order based upon the sum of the total component scores for each component in each personalized telecommunications package of the plurality of personalized telecommunications packages; and receiving, by the application, a request for purchase of at least one package of the plurality of packages.

2. The method of claim 1, wherein each of the plurality of selections of lifestyle attributes comprises a lifestyle attribute and a selection of an importance weighting factor associated with each selected lifestyle attribute.

3. The method of claim 2, wherein the plurality of lifestyle attributes are associated with a plurality of categories, and wherein the plurality of categories comprise business, home/family, social, entertainment, hobbies, and spending tendencies.

4. The method of claim 1, wherein calculating a weighted lifestyle attribute comprises multiplying a selected ranking of a lifestyle attribute and a selected importance weighting factor associated with the lifestyle attribute, and wherein calculating the weighted user preference comprises multiplying a selected ranking of the user preference by a selected importance weighting factor associated with the user preference.

5. The method of claim 1, wherein each of the plurality of personalized telecommunications packages comprise at least three of a portable electronic device package component, a subscription plan package component, an application package component, an accessory package component, and a service package component.

6. A system for recommending personalized telecommunications product packages comprising:

an electronic device comprising a graphical user interface, wherein the electronic device is in communication with a network;

a server, wherein the server comprises a plurality of data stores; and an application, wherein the server is in communication with the network;

wherein a first data store of the plurality of data stores comprises a plurality of lifestyle attributes, a plurality of user preferences, a preference/component matrix, and a lifestyle attribute/component matrix, and a feedback matrix, wherein the preference/component matrix comprises a plurality of ratings for a plurality of package components for each user preference of the plurality of user preferences, and wherein the lifestyle attribute/component matrix comprises a plurality of ratings for the plurality of package components for each lifestyle attribute of the plurality of lifestyle attributes;

wherein the application:

receives a selection comprising at least some of the plurality of user preferences and a weighting factor of each of the selected preferences;

receives a selection comprising at least some of the plurality of lifestyle attributes and a weighting factor for each of the selected lifestyle attributes;

calculates a total user score for each package component based upon the selected lifestyle attributes and the selected user preferences;

calculates a total telecommunications service provider score for each package component based on the preference/component matrix and the lifestyle attribute/component matrix;

calculates a plurality of total scores for each package of a plurality of packages based on the total telecommunications service provider score and the total user score, wherein each package comprises at least some of the package components;

displays the plurality of total scores on the graphical user interface in a ranked order based on the plurality of total scores; and receives a selection, wherein the selection comprises at least one of the plurality of packages.

7. The system of claim 6, wherein the plurality of package components comprise portable electronic devices, subscription plans, applications, accessories, and services.

8. The system of claim 6, wherein the plurality of lifestyle attributes are associated with a plurality of categories, and the plurality of categories comprise business, home/family, social, entertainment, hobbies, and spending tendencies.

9. The system of claim 6, wherein the preference/component matrix comprises a rating that captures a likelihood that a package component of the plurality of package components will satisfy a user preference.

10. The system of claim 6, wherein the lifestyle attribute/component matrix comprises a rating that captures a likelihood that a package component of the plurality of package components will satisfy a lifestyle attribute and the associated importance weighting of the lifestyle attribute.

11. The system of claim 6, wherein the feedback matrix comprises a plurality of feedback information based upon at least one of previously purchased packages or package components.

12. A method for generating personalized telecommunications package recommendations comprising:

building, by a matrix builder application on a server, a lifestyle attribute/component matrix, wherein the lifestyle/component matrix comprises a plurality of information about a plurality of package components;

receiving, by an application on a server, a plurality of lifestyle attribute selections, in response to a survey;

calculating, by the application, a total user score for the plurality of package components based on at least the received lifestyle attributes and based on a matrix of a plurality of matrixes and a plurality of demographic information associated with a plurality of customer accounts, wherein each matrix of the plurality of matrixes comprises a plurality of scores, wherein each score of the plurality of scores corresponds to a package component of the plurality of package components, and wherein each package component of the plurality of package components is one of supported by a telecommunications service provider or associated with a package component supported by the telecommunications service provider;

calculating, by the application, a total telecommunications service provider score based on at least the lifestyle attribute/component matrix;

calculating, by the application, a total score based on at least the total telecommunications service provider score and the total user score;

displaying, by the application, on a graphical user interface, the total user score for a plurality of packages, wherein each package of the plurality of packages comprises at least some of the package components of the plurality of package components; and recommending, by the application, at least some of the plurality of packages, wherein the recommendation is based on a sum of the total scores for each component in each package of the at least some of the plurality of packages.

13. The method of claim 12, wherein the selected lifestyle attributes are weighted prior to calculating the total user score, and wherein the weight is selected based on the importance of each associated selected lifestyle attribute.

14. The method of claim 12, further comprising: receiving, by the application, a purchase request for at least one package of the plurality of packages.

15. The method of claim 14, further comprising:
sending, by the application, a request for feedback about the purchased package.

16. The method of claim 15, further comprising receiving, by the application, feedback about the purchased package.

17. The method of claim 16, further comprising generating, by the application, in response to receiving the feedback, a feedback/component matrix.

18. The method of claim 17, further comprising calculating, by the application, a new total telecommunications service provider score for at least one of a package or a package component based on at least the lifestyle attribute/component matrix, and the feedback/component matrix.

19. The method of claim 18, further comprising calculating, by the application, a new total score for each package based on at least the total telecommunications service provider score, the total user score, and a total feedback score, wherein the total feedback score is based on the feedback/component matrix.

* * * * *